(12) United States Patent
Kitamura

(10) Patent No.: US 12,194,805 B2
(45) Date of Patent: Jan. 14, 2025

(54) DRIVE UNIT

(71) Applicant: EXEDY Corporation, Neyagawa (JP)

(72) Inventor: Taichi Kitamura, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 18/596,050

(22) Filed: Mar. 5, 2024

(65) Prior Publication Data

US 2024/0326532 A1 Oct. 3, 2024

(30) Foreign Application Priority Data

Mar. 28, 2023 (JP) ................................ 2023-052117
Nov. 15, 2023 (JP) ................................ 2023-194272

(51) Int. Cl.
*B60G 3/20* (2006.01)
*B60G 7/00* (2006.01)
*B60G 7/02* (2006.01)
*B60K 1/00* (2006.01)

(52) U.S. Cl.
CPC ............... *B60G 3/20* (2013.01); *B60G 7/001* (2013.01); *B60G 7/02* (2013.01); *B60K 1/00* (2013.01)

(58) Field of Classification Search
CPC . B60G 3/20; B60G 7/001; B60G 7/02; B60K 1/00
See application file for complete search history.

(56) References Cited

U.S. PATENT DOCUMENTS

| | | | | |
|---|---|---|---|---|
| 5,511,926 A | * | 4/1996 | Iles | B64F 1/227 414/428 |
| 6,112,838 A | * | 9/2000 | Klein | B64F 1/226 180/19.3 |
| 6,209,671 B1 | * | 4/2001 | Klein | B64F 1/22 180/19.3 |
| 6,554,086 B1 | * | 4/2003 | Goertzen | A61G 5/128 180/907 |
| 8,967,637 B2 | * | 3/2015 | Perry | B62B 3/0606 280/47.34 |
| 9,913,771 B2 | * | 3/2018 | March | B62B 5/0079 |
| 10,751,232 B1 | * | 8/2020 | Ilao | A61G 5/1051 |
| 11,617,694 B2 | * | 4/2023 | Hart | A61G 5/1086 180/11 |
| 2013/0062128 A1 | * | 3/2013 | Johnson | B64F 1/226 180/11 |
| 2019/0142661 A1 | * | 5/2019 | Shemer | A61G 5/047 180/11 |

FOREIGN PATENT DOCUMENTS

JP 7040738 B2 3/2022

* cited by examiner

*Primary Examiner* — Toan C To
(74) *Attorney, Agent, or Firm* — United IP Counselors, LLC

(57) ABSTRACT

It is intended to sufficiently apply a wheel pressure to a drive wheel. An upper unit is configured to be attached to a mobile object. A drive wheel is disposed to be movable in an up-and-down direction with respect to the upper unit. A drive source is configured to drive the drive wheel. A support arm is pivotably attached to the upper unit. The support arm extends slantingly downward from the upper unit. The support arm supports the drive wheel. An urging mechanism urges the support arm downward.

5 Claims, 4 Drawing Sheets

SECOND DIRECTION ←         → FIRST DIRECTION

SECOND DIRECTION ←→ FIRST DIRECTION

SECOND DIRECTION ←→ FIRST DIRECTION

DRIVE UNIT

CROSS-REFERENCE TO RELATED APPLICATIONS

This application is based on and claims the priority benefit of Japanese application Nos. 2023-052117 filed on Mar. 28, 2023, and 2023-194272 filed on Nov. 15, 2023, the contents of which are incorporated herein by reference.

TECHNICAL FIELD

The present invention relates to a drive unit.

BACKGROUND

There has been proposed a type of drive unit attached to such a mobile object as a cart without a drive source. For example, Publication of Japan Patent No. 7040738 discloses a drive unit including an electric motor and a drive wheel driven by the electric motor. The drive unit includes a pressure-receiving spring member by which a wheel pressure acts on the drive wheel. The pressure-receiving spring member urges the drive wheel toward the road surface such that the wheel pressure acts on the drive wheel, whereby spinning of the drive wheel is prevented. The drive unit includes a caster other than the drive wheel such that stable traveling is enabled.

There is a concern with the drive unit configured as described above that the wheel pressure does not sufficiently act on the drive wheel in traveling, because a pressing load, with which the wheel pressure acts on the drive wheel, is distributed to the caster as well.

It is an object of the present invention to provide a drive unit in which a wheel pressure is enabled to sufficiently act on a drive wheel.

SUMMARY OF THE INVENTION

A drive unit according to a first aspect is configured to be attached to a mobile object. The drive unit includes an upper unit, a drive wheel, a drive source, a support arm, and an urging mechanism. The upper unit is configured to be attached to the mobile object. The drive wheel is disposed to be movable in an up-and-down direction with respect to the upper unit. The drive source is configured to drive the drive wheel. The support arm is pivotably attached to the upper unit. The support arm extends slantingly downward from the upper unit. The support arm supports the drive wheel. The urging mechanism urges the support arm downward.

According to the configuration, the support arm, supporting the drive wheel, extends slantingly downward from the upper unit and is pivotably attached to the upper unit; hence, the urging mechanism is made configured to urge the drive wheel toward the road surface. Because of this, the drive unit is enhanced in freestanding stableness, whereby it is made unnecessary for the drive unit to be provided with such a driven wheel as a caster in traveling. As a result, it is made possible to sufficiently apply a wheel pressure to the drive wheel.

A drive unit according to a second aspect relates to the drive unit according to the first aspect and is configured as follows. The support arm includes a pivot axis disposed not to overlap vertically with the drive wheel.

A drive unit according to a third aspect relates to the drive unit according to the first or second aspect and is configured as follows. The urging mechanism is an elastic member.

A drive unit according to a fourth aspect relates to the drive unit according to the first or second aspect and further includes an operating member. The drive unit is configured to make the mobile object travel in a first direction. The urging mechanism includes a first link, a second link, and a first joint. The first link is pivotably attached to the upper unit. The first link extends from the upper unit both downward and in a second direction that is oriented opposite to the first direction. The second link is pivotably attached to the support arm. The second link extends from the support arm both upward and in the second direction. The first joint connects the first and second links therethrough to each other. The operating member is configured to move the first joint in the first direction when a human drive force is inputted thereto in the first direction.

A drive unit according to a fifth aspect relates to the drive unit according to the fourth aspect and is configured as follows. The urging mechanism includes a third link, a fourth link, and a second joint. The third link is pivotably attached to the upper unit. The third link extends from the upper unit both downward and in the first direction. The fourth link is pivotably attached to the support arm. The fourth link extends from the support arm both upward and in the first direction. The second joint connects the third and fourth links therethrough to each other. The operating member is configured to move the second joint in the second direction when the human drive force is inputted thereto in the second direction.

Overall, according to the present invention, it is made possible to sufficiently apply the wheel pressure to the drive wheel.

DETAILED DESCRIPTION

Figure 1:
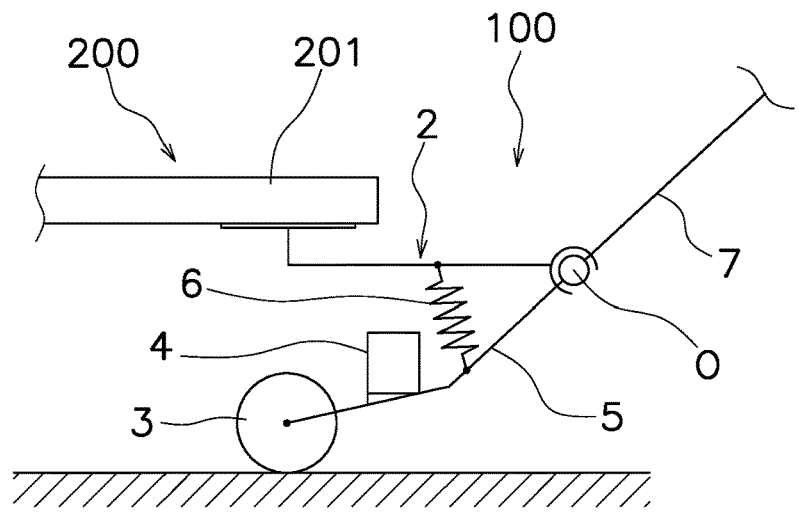
FIG. 1 is a schematic diagram of a drive unit attached to a cart.

A drive unit 100 according to the present preferred embodiment will be hereinafter explained with reference to drawings. FIG. 1 is a side view of the drive unit 100 attached to a cart 200 (exemplary mobile object). In the present preferred embodiment, the term "first direction" refers to a direction of traveling made in towing the drive unit 100, whereas the term "second direction" refers to a direction of traveling made in pushing the drive unit 100. When using the drive unit 100, a user is located on the first directional side of the drive unit 100. It should be noted that the right direction in FIG. 1 corresponds to the first direction, whereas the left direction in FIG. 1 corresponds to the second direction. On the other hand, the term "axial direction" refers to an extending direction of a rotational axis of a drive wheel 3.

As shown in FIG. 1, the drive unit 100 is attached to the cart 200. The cart 200 includes a bed 201 and a plurality of vehicle wheels (omitted in illustration). The cart 200 is a mobile object without such a drive source as an electric motor. The vehicle wheels of the cart 200 are driven wheels.

When towed by the user, the cart 200 is enabled to travel in the first direction. Contrarily, when pushed by the user, the cart 200 is enabled to travel in the second direction. It should be noted that the drive unit 100 is attachable not only to the cart but also to a variety of mobile objects such as a stretcher, a cage cart, and a wheelchair.

The drive unit 100 is configured to be attached to the cart 200. The drive unit 100 includes an upper unit 2, the drive wheel 3, an electric motor 4 (exemplary drive source), a support arm 5, an urging mechanism 6, and an operating member 7.

The upper unit 2 is configured to be attached to the cart 200. For example, the upper unit 2 may include at least one toggle clamp and may be attached to the cart 200 with the at least one toggle clamp. Alternatively, the upper unit 2 may be attached to the cart 200 by at least one bolt and/or so forth. The upper unit 2 is fixed to the cart 200 to be unitarily moved therewith. It should be noted that the upper unit 2 is disposed below the cart 200 but may not be disposed below the cart 200. The upper unit 2 may include a part unitarily moved with the cart 200 and a part moved with respect to the cart 200.

The drive wheel 3 is disposed below the upper unit 2. The drive wheel 3 is disposed to be movable in an up-and-down direction with respect to the upper unit 2. In other words, distance between the drive wheel 3 and the upper unit 2 is variable. It should be noted that the drive unit 100 is in contact only at the drive wheel 3 with the road surface in traveling. In other words, the drive unit 100 does not include, except for the drive wheel 3, a member in contact with the road surface in traveling.

The electric motor 4 is supported by the support arm 5. The electric motor 4 is configured to drive the drive wheel 3. The electric motor 4 is supplied with electricity from a battery (omitted in illustration).

The support arm 5 extends slantingly downward from the upper unit 2. When described in detail, the support arm 5 extends from the upper unit 2 both downward and in the second direction. The support arm 5 is pivotably attached to the upper unit 2. When described in detail, the support arm 5 is attached at the upper end thereof to the upper unit 2. The support arm 5 supports the drive wheel 3 such that the drive wheel 3 is made rotatable. When described in detail, the drive wheel 3 is rotatably supported by the lower end of the support arm 5.

The support arm 5 is pivotable about a pivot axis O. When described in detail, the support arm 5 is pivoted about the pivot axis O in the up-and-down direction. When the support arm 5 is pivoted upward, the lower end thereof is moved upward to approach the upper unit 2. In other words, the support arm 5 is pivoted clockwise about the pivot axis O in FIG. 1. When the support arm 5 is pivoted downward, the lower end thereof is moved downward to separate from the upper unit 2. In other words, the support arm 5 is pivoted counterclockwise about the pivot axis O in FIG. 1. The pivot axis O of the support arm 5 is disposed not to overlap vertically with the drive wheel 3. It should be noted that the support arm 5 may be composed of a plurality of members. The members composing the support arm 5 are unitarily pivoted with each other.

The urging mechanism 6 urges the support arm 5 downward. The urging mechanism 6 is disposed between the upper unit 2 and the support arm 5. Additionally, the urging mechanism 6 is disposed between the drive wheel 3 and the pivot axis O. The urging mechanism 6 is, for instance, an elastic member, more specifically, a compression spring. The urging mechanism 6 is attached at the upper end thereof to the upper unit 2, while being attached at the lower end thereof to the support arm 5. With an urging force generated by the urging mechanism 6, the wheel pressure acts on the drive wheel 3. When described in detail, the urging mechanism 6 is attached to a part configured to be unitarily moved up and down with the cart 200 amongst the constituent parts of the upper unit 2.

The operating member 7 is attached to either the upper unit 2 or the support arm 5. The operating member 7 is pivotably attached to either the upper unit 2 or the support arm 5. The operating member 7 is configured to receive a human drive force inputted thereto by a user in either the first or second direction. For example, a handle to be held by the user is attached to the distal end of the operating member 7. When the user pulls the operating member 7 in the first direction, the cart 200 is caused to travel in the first direction. Contrarily, when the user pushes the operating member 7 in the second direction, the cart 200 is caused to travel in the second direction.

Figure 2:
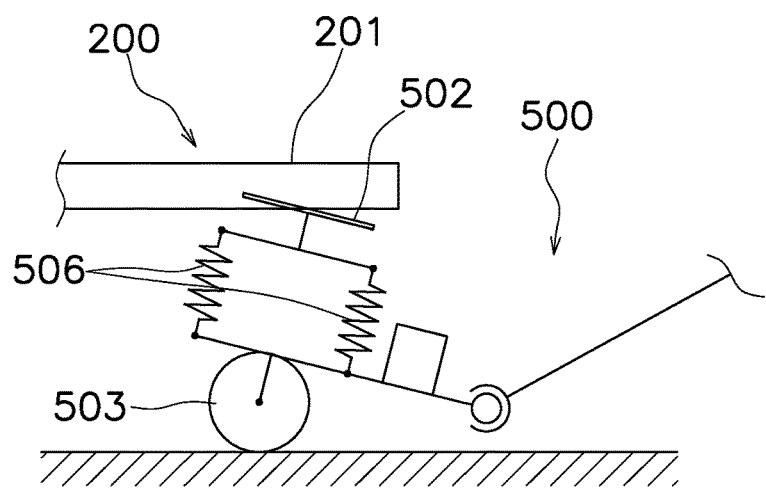
FIG. 2 is a schematic diagram of a well-known drive unit that a caster is detached therefrom.

The drive unit 100 configured as described above is enhanced in freestanding stableness in traveling as follows. First, when it is assumed to detach a caster from a well-known drive unit 500 as shown in FIG. 2, the well-known drive unit 500 is changed in configuration to be pivoted about an upper unit 502. Once the well-known drive unit 500 begins to tilt downward, compression springs 506 urge a drive wheel 503 to tilt the well-known drive unit 500 as downward as possible. Thus, the well-known drive unit 500 is configured to be likely to take a downward tilt posture. Because of this, the well-known drive unit 500 requires not only the drive wheel but also such a vehicle wheel as a caster in traveling.

By contrast to this, in the drive unit 100 according to the present preferred embodiment, as shown in FIG. 1, the drive wheel 3 is pivoted about the pivot axis O unitarily with the support arm 5 extending slantingly upward from the drive wheel 3. Because of this, even when the drive unit 100 takes a downward tilt posture, the urging mechanism 6 urges the drive wheel 3 toward the road surface without urging the drive wheel 3 in such a direction that the drive unit 100 tilts downward. As a result, the drive unit 100 according to the present preferred embodiment is enhanced in freestanding stableness and can be prevented from falling in traveling even without being provided with such a driven wheel as a caster.

[Modifications]

One preferred embodiment of the present invention has been explained above. However, the present invention is not limited to the above, and a variety of changes can be made without departing from the gist of the present invention. It should be noted that basically speaking, respective modifications to be described are applicable simultaneously.

(a) The drive unit 100 may include not only the drive wheel 3 but also such a driven wheel as a caster. The caster is not used in traveling. Specifically, only the drive wheel 3 is in contact with the road surface in traveling. The caster is used in stop to stabilize the drive unit 100.

Figure 3:
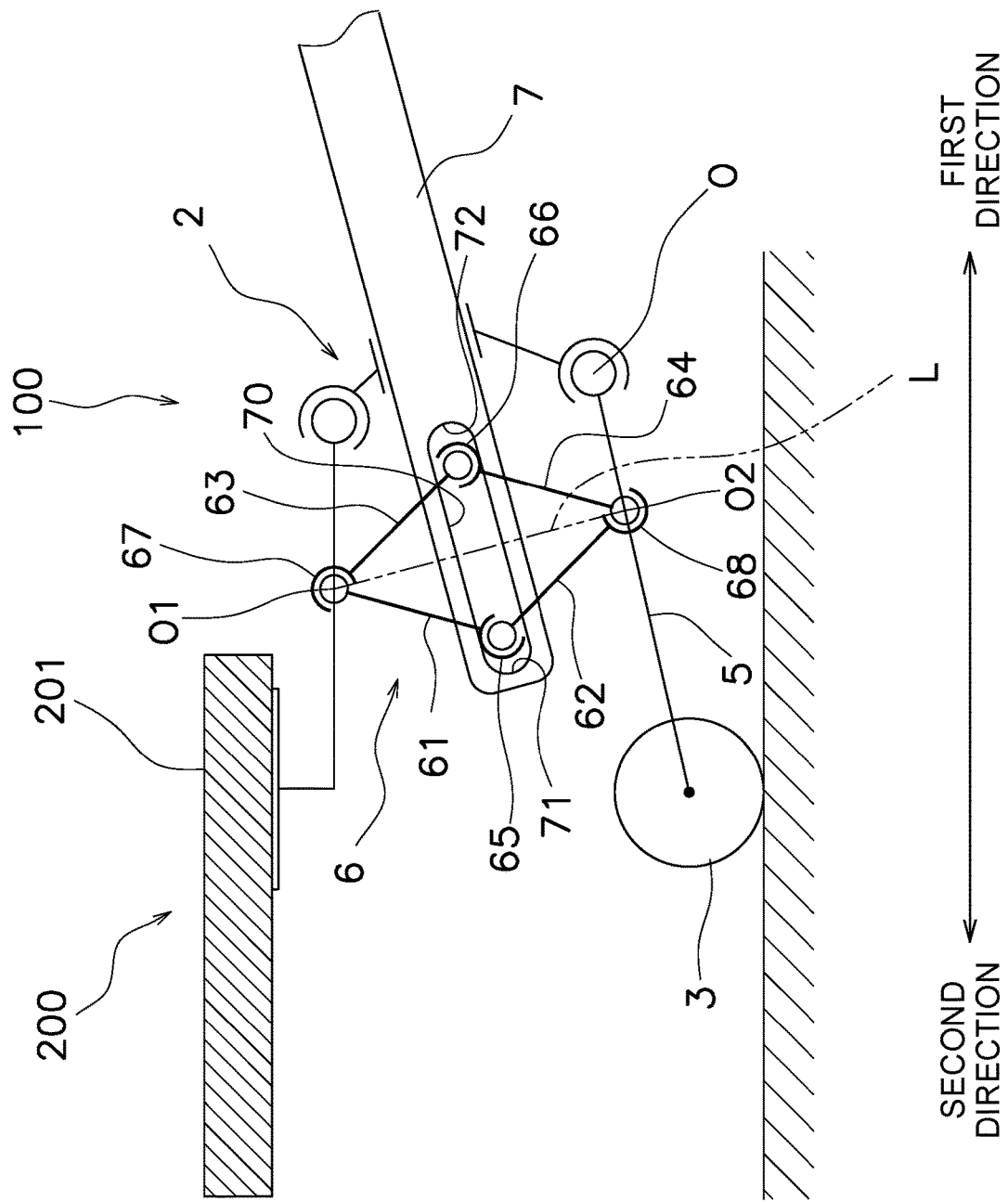
FIG. 3 is a schematic diagram of a drive unit according to a modification.

(b) The urging mechanism 6 is not limited to the elastic member described above. For example, as shown in FIG. 3, the urging mechanism 6 can be made in form of a link mechanism. The urging mechanism 6 includes a first link 61, a second link 62, a third link 63, a fourth link 64, a first joint 65, and a second joint 66. Besides, the urging mechanism 6 includes a third joint 67 and a fourth joint 68.

The first link 61 is pivotably attached to the upper unit 2. When described in detail, the first link 61 is attached at the upper end thereof to the upper unit 2. The upper end of the first link 61 is configured to be unitarily moved with the upper unit 2 in the up-and-down direction.

The first link 61 extends from the upper unit 2 both downward and in the second direction. In other words, the lower end of the first link 61 is disposed on the second directional side of the upper end thereof.

The first link 61 is pivotable about a first pivot axis O1. When described in detail, the first link 61 is pivoted about the first pivot axis O1 in both the first and second directions. When the first link 61 is pivoted in the first direction, the lower end thereof is moved in the first direction. In other words, the first link 61 is pivoted counterclockwise about the first pivot axis O1 in FIG. 3. When the first link 61 is pivoted in the second direction, the lower end thereof is moved in the second direction. In other words, the first link 61 is pivoted clockwise about the first pivot axis O1 in FIG. 3.

The second link 62 is pivotably attached to the support arm 5. When described in detail, the second link 62 is attached at the lower end thereof to the support arm 5. The lower end of the second link 62 is configured to be unitarily moved with the support arm 5 in the up-and-down direction.

The second link 62 extends from the support arm 5 both upward and in the second direction. In other words, the upper end of the second link 62 is disposed on the second directional side of the lower end thereof.

The second link 62 is pivotable about a second pivot axis O2. When described in detail, the second link 62 is pivoted about the second pivot axis O2 in both the first and second directions. When the second link 62 is pivoted in the first direction, the upper end thereof is moved in the first direction. In other words, the second link 62 is pivoted clockwise about the second pivot axis O2 in FIG. 3. When the second link 62 is pivoted in the second direction, the upper end thereof is moved in the second direction. In other words, the second link 62 is pivoted counterclockwise about the second pivot axis O2 in FIG. 3.

The first joint 65 connects the first and second links 61 and 62 therethrough to each other. When described in detail, the first joint 65 connects the lower end of the first link 61 and the upper end of the second link 62 therethrough to each other. It should be noted that the first and second links 61 and 62 are rotatably connected to each other through the first joint 65.

The first joint 65 is disposed on the second directional side of an imaginary line L connecting the first and second pivot axes O1 and O2. The first joint 65 is disposed to be movable in both the first and second directions. When the first joint 65 is moved in the first direction, i.e., when the first joint 65 approaches the imaginary line L, the first and second pivot axes O1 and O2 are moved in directions separating from each other. It should be noted that the first joint 65 is not moved across the imaginary line L in the first direction.

The third link 63 is pivotably attached to the upper unit 2. When described in detail, the third link 63 is attached at the upper end thereof to the upper unit 2. The upper end of the third link 63 is configured to be unitarily moved with the upper unit 2 in the up-and-down direction.

The third link 63 extends from the upper unit 2 both downward and in the first direction. In other words, the lower end of the third link 63 is disposed on the first directional side of the upper end thereof.

The third link 63 is pivotable about the first pivot axis O1. When described in detail, the third link 63 is pivoted about the first pivot axis O1 in both the first and second directions. When the third link 63 is pivoted in the first direction, the lower end of the third link 63 is moved in the first direction. In other words, the third link 63 is pivoted counterclockwise about the first pivot axis O1 in FIG. 3. When the third link 63 is pivoted in the second direction, the lower end thereof is moved in the second direction. In other words, the third link 63 is pivoted clockwise about the first pivot axis O1 in FIG. 3.

The fourth link 64 is pivotably attached to the support arm 5. When described in detail, the fourth link 64 is attached at the lower end thereof to the support arm 5. The lower end of the fourth link 64 is configured to be unitarily moved with the support arm 5 in the up-and-down direction.

The fourth link 64 extends from the support arm 5 both upward and in the first direction. In other words, the upper end of the fourth link 64 is disposed on the first directional side of the lower end thereof.

The fourth link 64 is pivotable about the second pivot axis O2. When described in detail, the fourth link 64 is pivoted about the second pivot axis O2 in both the first and second directions. When the fourth link 64 is pivoted in the first direction, the upper end thereof is moved in the first direction. In other words, the fourth link 64 is pivoted clockwise about the second pivot axis O2 in FIG. 3. When the fourth link 64 is pivoted in the second direction, the upper end thereof is moved in the second direction. In other words, the fourth link 64 is pivoted counterclockwise about the second pivot axis O2 in FIG. 3.

The second joint 66 connects the third and fourth links 63 and 64 therethrough to each other. When described in detail, the second joint 66 connects the lower end of the third link 63 and the upper end of the fourth link 64 therethrough to each other. It should be noted that the third and fourth links 63 and 64 are rotatably connected to each other through the second joint 66.

The second joint 66 is disposed on the first directional side of the imaginary line L connecting the first and second pivot axes O1 and O2. The second joint 66 is disposed to be movable in both the first and second directions. When the second joint 66 is moved in the second direction, i.e., when the second joint 66 approaches the imaginary line L, the first and second pivot axes O1 and O2 are moved in the directions separating from each other. It should be noted that the second joint 66 is not moved across the imaginary line L in the second direction.

The third joint 67 connects the first and third links 61 and 63 therethrough to each other. When described in detail, the third joint 67 connects the upper end of the first link 61 and that of the third link 63 therethrough to each other. It should be noted that the first and third links 61 and 63 are rotatably connected to each other through the third joint 67.

The third joint 67 is disposed in the identical position to the first pivot axis O1. The third joint 67 is attached to the upper unit 2 to be unitarily moved therewith in the up-and-down direction.

The fourth joint 68 connects the second and fourth links 62 and 64 therethrough to each other. When described in detail, the fourth joint 68 connects the lower end of the second link 62 and that of the fourth link 64 therethrough to each other. It should be noted that the second and fourth links 62 and 64 are rotatably connected to each other through the fourth joint 68.

The fourth joint 68 is disposed in the identical position to the second pivot axis O2. The fourth joint 68 is attached to the support arm 5 to be unitarily moved therewith in the up-and-down direction.

The operating member 7 is disposed in adjacent to the urging mechanism 6 in the axial direction (perpendicular to the drawing in FIG. 3). The operating member 7 is configured to operate the urging mechanism 6. When the user pulls the operating member 7 in the first direction to make the cart 200 travel in the first direction, the human drive force is inputted to the operating member 7 in the first direction. Contrarily, when the user pushes the operating member 7 in the second direction to make the cart 200 travel in the second direction, the human drive force is inputted to the operating member 7 in the second direction.

The operating member 7 is configured to move the first joint 65 in the first direction when the human drive force is inputted thereto in the first direction. When described in detail, the operating member 7 includes a first contact surface 71. The first contact surface 71 faces the first direction. The operating member 7 includes a slit hole 70 extending in both the first and second directions. Amongst the inner wall surfaces defining the slit hole 70, the one facing the first direction corresponds to the first contact surface 71.

The first contact surface 71 is opposed to either the first joint 65 or a member unitarily moved with the first joint 65 in the first direction. For example, the first joint 65 axially extends from either the first or second link 61, 62. Besides, the first joint 65 is disposed in part within the slit hole 70 of the operating member 7.

The operating member 7 is configured to move the second joint 66 in the second direction when the human drive force is inputted thereto in the second direction. When described in detail, the operating member 7 includes a second contact surface 72. The second contact surface 72 faces the second direction. Amongst the inner wall surfaces defining the slit hole 70, the one facing the second direction corresponds to the second contact surface 72.

The second contact surface 72 is opposed to either the second joint 66 or a member unitarily moved with the second joint 66 in the second direction. For example, the second joint 66 axially extends from either the third or fourth link 63, 64. Besides, the second joint 66 is disposed in part within the slit hole 70 of the operating member 7.

The drive unit 100 configured as described above operates as follows. First, when intending to make the cart 200 travel in the first direction, the user pulls the operating member 7 in the first direction. Accordingly, the human drive force oriented in the first direction is inputted to the operating member 7, whereby the first contact surface 71 is contacted with the first joint 65.

The upper unit 2 and the support arm 5 are interposed between the road surface and the cart 200; hence, the following forces are generated when the user pulls the operating member 7 in the first direction: a force by which the upper unit 2 is pressed onto the cart 200 and a force by which the support arm 5 is urged downward. Thus, the urging mechanism 6 urges the support arm 5 downward, whereby the wheel pressure is enabled to act on the drive wheel 3. When the cart 200 is herein heavy, the force required for the user to pull the operating member 7 in the first direction is increased in magnitude; hence, the wheel pressure acting on the drive wheel 3 is increased in magnitude as well. Contrarily, when the cart 200 is lightweight, the force required for the user to pull the operating member 7 in the first direction is reduced in magnitude; hence, the wheel pressure acting on the drive wheel 3 is reduced in magnitude as well. Thus, the drive unit 100 is enabled to change the magnitude of the wheel pressure acting on the drive wheel 3 in accordance with the weight of the cart 200.

Next, when intending to make the cart 200 travel in the second direction, the user pushes the operating member 7 in the second direction. Accordingly, the human drive force oriented in the second direction is inputted to the operating member 7, whereby the second contact surface 72 is contacted with the second joint 66.

The upper unit 2 and the support arm 5 are interposed between the road surface and the cart 200; hence, the following forces are generated when the user pushes the operating member 7 in the second direction: the force by which the upper unit 2 is pressed onto the cart 200 and the force by which the support arm 5 is urged downward. Thus, the urging mechanism 6 urges the support arm 5 downward, whereby the wheel pressure is enabled to act on the drive wheel 3. When the cart 200 is herein heavy, the force required for the user to push the operating member 7 in the second direction is increased in magnitude; hence, the wheel pressure acting on the drive wheel 3 is increased in magnitude as well. Contrarily, when the cart 200 is lightweight, the force required for the user to push the operating member 7 in the second direction is reduced in magnitude; hence, the wheel pressure acting on the drive wheel 3 is reduced in magnitude as well. Thus, similarly when the cart 200 is intended to travel in the second direction, the drive unit 100 is enabled to change the magnitude of the wheel pressure acting on the drive wheel 3 in accordance with the weight of the cart 200.

It should be noted that the urging mechanism 6 includes the first to fourth links 61 to 64; however, the urging mechanism 6 is not limited in configuration to this. For example, the urging mechanism 6 may include the first and second links 61 and 62 without including the third and fourth links 63 and 64.

Figure 4:
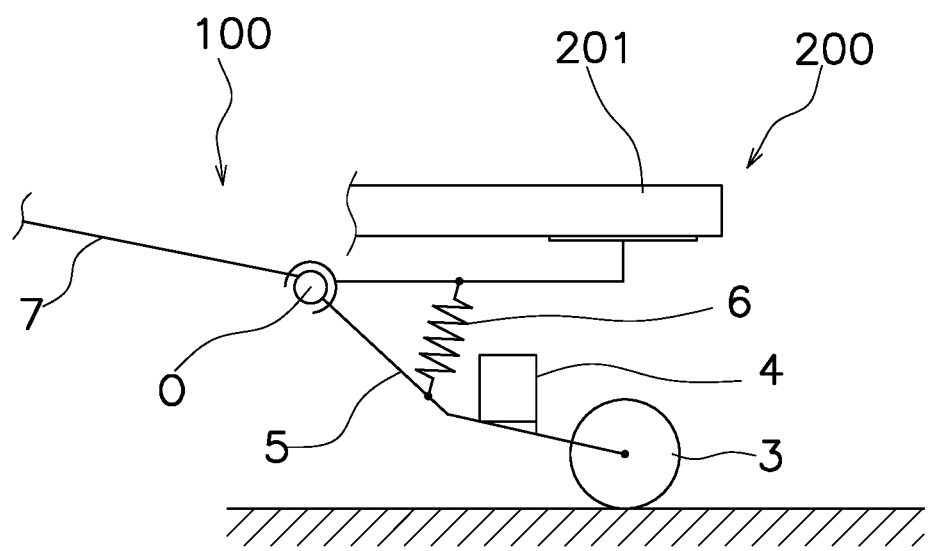
FIG. 4 is a schematic diagram of a drive unit according to another modification.

(c) The preferred embodiment described above has explained the method of using the drive unit 100 as follows: the drive unit 100 is towed for traveling in the first direction; contrarily, the drive unit 100 is pushed for traveling in the second direction. However, the method of using the drive unit 100 is not limited to this. For example, as shown in FIG. 4, the user may be disposed on the second directional side of the drive unit 100. In this case, the operating member 7 extends from the urging mechanism 6 in the second direction. Then, the drive unit 100 is towed for traveling in the second direction; contrarily, the drive unit 100 is pushed for traveling in the first direction.

Figure 5:
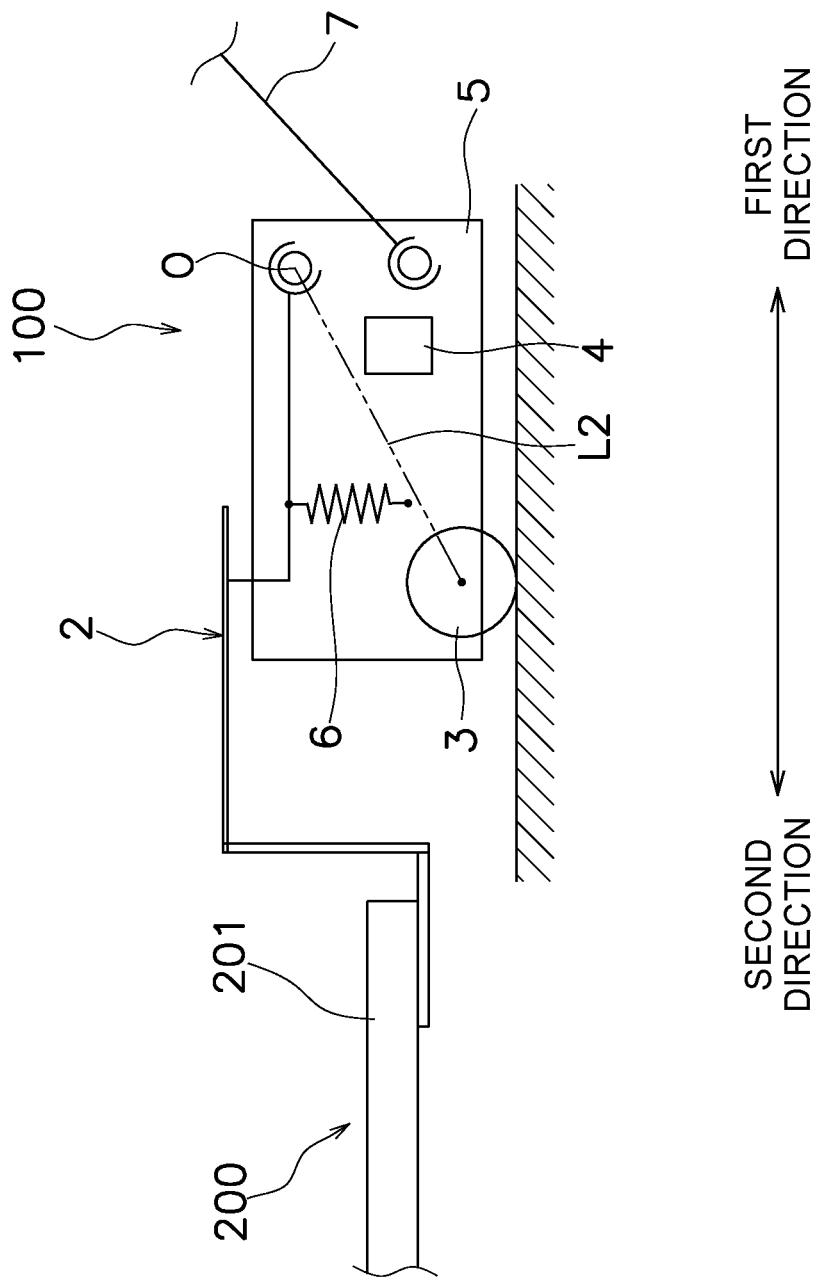
FIG. 5 is a schematic diagram of a drive unit according to yet another modification.

(d) As shown in FIG. 5, the support arm 5 may be made in shape of a plate. In this case, the state "the support arm extends slantingly downward from the upper unit" means that an imaginary line L2, connecting the pivot axis O of the support arm 5 and the rotational axis (O3) of the drive wheel 3, extends slantingly downward from the pivot axis O. Besides, not the support arm 5 but the upper unit 2 may be pivoted about the pivot axis O.

(e) As shown in FIG. 5, the operating member 7 and the upper unit 2 may be pivotably attached to the support arm 5 at positions different from each other.

(f) As shown in FIG. 5, the drive wheel 3 may not be disposed below the cart 200. In this case, the upper unit 2 extends toward the cart 200.

LIST OF REFERENCE NUMERALS

2: Upper unit, 3: Drive wheel, 4: Electric motor, 5: Support arm, 6: Urging mechanism, 7: Operating member, 61: First link, 62: Second link, 63: Third link, 64: Fourth link, 65: First joint, 66: Second joint, 100: Drive unit

What is claimed is:

1. A drive unit configured to be attached to a mobile object, the drive unit comprising:
    an upper unit configured to be attached to the mobile object;

a support arm pivotably attached to the upper unit and extending slantingly downward from the upper unit;

a drive wheel supported by the support arm and disposed to be movable in an up-and-down direction with respect to the upper unit as the support arm pivots relative to the upper unit;

a drive source configured to drive the drive wheel; and an urging mechanism disposed between the upper unit and the support arm, the urging mechanism configured to bias the upper unit and the support arm away from each other via expansionary force that urges the support arm downward when the drive unit is attached to the mobile object.

2. The drive unit according to claim 1, wherein the support arm includes a pivot axis disposed not to overlap with the drive wheel vertically.

3. The drive unit according to claim 1, wherein the urging mechanism is an elastic member that is compressed between the upper unit and the support arm.

4. The drive unit according to claim 1, further comprising:

an operating member, wherein the drive unit is configured to make the mobile object travel in a first direction, the urging mechanism includes
- a first link pivotably attached to the upper unit, the first link extending from the upper unit both downward and in a second direction oriented opposite to the first direction,
- a second link pivotably attached to the support arm, the second link extending from the support arm both upward and in the second direction, and
- a first joint connecting the first and second links therethrough to each other, and the operating member is configured to move the first joint in the first direction when a human drive force is inputted thereto in the first direction.

5. The drive unit according to claim 4, wherein the urging mechanism includes
- a third link pivotably attached to the upper unit, the third link extending from the upper unit both downward and in the first direction,
- a fourth link pivotably attached to the support arm, the fourth link extending from the support arm both upward and in the first direction, and
- a second joint connecting the third and fourth links therethrough to each other, and the operating member is configured to move the second joint in the second direction when the human drive force is inputted thereto in the second direction.

* * * * *